United States Patent
Park et al.

(10) Patent No.: US 12,313,568 B1
(45) Date of Patent: May 27, 2025

(54) LIGHT REFLECTION SUPPORT AND THROUGH HOLE INSPECTION SYSTEM

(71) Applicants: JOONGWOO M-TECH CO., LTD., Ansan-si (KR); AKC CO., LTD., Hwaseong-si (KR)

(72) Inventors: Sung Soo Park, Yongin-si (KR); Hyun Jin Tak, Sejong-si (KR); Dong Kook Bae, Hwaseong-si (KR); Hyeon Gu Kim, Hwaseong-si (KR); Jang Won Shin, Incheon (KR); Jin Hwan Bae, Osan-si (KR)

(73) Assignees: JOONGWOO M-TECH CO., LTD., Ansan-si (KR); AKC CO., LTD., Hwaseong-si (KR)

( * ) Notice: Subject to any disclaimer, the term of this patent is extended or adjusted under 35 U.S.C. 154(b) by 0 days.

(21) Appl. No.: 18/815,092

(22) Filed: Aug. 26, 2024

(51) Int. Cl.
  *G01N 21/954* (2006.01)
  *G01B 11/12* (2006.01)
  *G01N 21/88* (2006.01)

(52) U.S. Cl.
  CPC .......... *G01N 21/954* (2013.01); *G01B 11/12* (2013.01); *G01N 21/8806* (2013.01); *G01N 21/8851* (2013.01); *G01B 2210/42* (2013.01)

(58) Field of Classification Search
  CPC .......... G01N 21/954; G01N 21/8806; G01N 21/8851; G01B 11/12; G01B 2210/42
  See application file for complete search history.

(56) References Cited

U.S. PATENT DOCUMENTS

| | | | |
|---|---|---|---|
| 6,618,147 B1 * | 9/2003 | Burry | G02B 21/0004 356/138 |
| 2002/0003216 A1 * | 1/2002 | Kida | G03F 7/70458 250/548 |

FOREIGN PATENT DOCUMENTS

| | | | |
|---|---|---|---|
| CN | 113834826 A | * | 12/2021 |
| JP | WO2019039331 A1 | * | 8/2020 |
| KR | 10-2002-0075823 A | | 10/2002 |
| KR | 10-2013-0007225 A | | 1/2013 |
| KR | 10-2015-0106672 A | | 9/2015 |
| KR | 10-2557965 B1 | | 7/2022 |
| KR | 20220105770 A | * | 7/2022 |
| KR | 10-2022-0133084 A | | 10/2022 |

* cited by examiner

*Primary Examiner* — Tri T Ton
(74) *Attorney, Agent, or Firm* — Bridgeway IP Law Group, PLLC; Jihun Kim

(57) ABSTRACT

An embodiment provides a light reflection support and a through hole inspection system including the same, wherein the light reflection support stably fixes and supports a glass substrate, an inspection target, and reflects illumination light to a lower part of a glass substrate arranged on the opposite side of an imaging part to increase inspection precision from a clear imaged image of a through hole. The light reflection support is used in a device that images a through hole formed in a substrate and inspects whether the through hole is normal from the imaged image, and includes a transparent support part and a reflection layer part. The transparent support part supports the substrate and has a suction hole that extends to a solid area of the substrate where the through hole is not formed.

8 Claims, 5 Drawing Sheets

LIGHT REFLECTION SUPPORT AND THROUGH HOLE INSPECTION SYSTEM

CROSS-REFERENCE TO RELATED APPLICATIONS

This application claims priority from Korean Patent Application No. 10-2024-0001058, filed on Jan. 3, 2024, in the Korean Intellectual Property Office, which is incorporated herein by reference in its entirety.

BACKGROUND

The disclosure relates to a light reflection support and a through hole inspection system, and specifically, to a light reflection support capable of stably fixing and supporting a glass substrate, an inspection target, while reflecting illumination light to the lower part of a glass substrate arranged on the opposite side of an imaging part to improve inspection precision for a through hole formed in a glass substrate, and a through hole inspection system including the same.

Usually, a glass substrate has multiple via channels (hereinafter, referred to as through holes), and the location and shape must be inspected to see if they meet the standards.

The through holes of a glass substrate may have a shape with a center diameter narrower than both ends due to the characteristics of chemical processing such as etching rather than mechanical processing such as drilling. These through holes of a glass substrate with a waist diameter having the concave center must be inspected in all areas of the upper part diameter, lower part diameter, and waist diameter of the hole.

Meanwhile, through a method for measuring the through holes of a glass substrate, the normality of the location and shape of the through holes may be inspected based on an imaged image captured by a camera.

In relation thereto, there is a glass substrate inspection system provided with a hole of Republic of Korea Patent Publication No. 2557965 (hereinafter, referred to as "related art document 1").

Related art document 1 includes a camera installed on the upper or lower side of a glass substrate having a through hole, a light source (lighting) installed on the lower or upper side of the glass substrate, and an inspection module that inspects the through hole of the glass substrate from an imaged image captured by the camera. As described above, related art document 1 performs a step of first imaging the upper part of the through hole, upside-down reversing the glass substrate using an inversion unit for inspection precision of the waist diameter and lower part diameter of the through hole, which has a concave shape, and then re-imaging the lower part of the through hole.

However, related art document 1 requires a lot of time for an inspection process due to the inversion operation of the glass substrate and the increase in the number of imaging times. In addition, there are difficulties in the facility structure, such as the addition of a complex substrate handling unit, such as a substrate inversion unit and a substrate holding unit, in addition to the substrate transfer unit that is basically required for the inspection process of an in-line glass substrate.

As an alternative to related art document 1, in order to increase the inspection precision for the waist diameter and lower part diameter of the through hole, there is a method of additionally installing a lower part light such as a reflection plate on the lower part of the substrate opposite the light source and camera without flipping the glass substrate upside down.

However, as explained above, in an inspection process of an inline glass substrate, there is a structural difficulty in installing a lower part lighting due to interference from a substrate transfer unit or the like. In particular, in an inline inspection process, the loading and unloading operations of a substrate generally use an adsorption pad, but in this case, there is a difficulty in implementing the actual equipment due to the structural interference between a suction hole of the adsorption pad for transmitting the adsorption force to the substrate and the lower part lighting for transmitting illumination light to the substrate.

Therefore, a new structural inspection system is required that can stably fix and support a glass substrate while effectively transmitting light to the lower part of the glass substrate arranged on the opposite side of a camera, and perform inspection of a through hole quickly and accurately.

RELATED ART DOCUMENT

Patent Document

Republic of Korea Patent Publication No. 2557965 (Publication date: Jul. 20, 2023)

SUMMARY

An aspect of the disclosure is to provide a light reflection support capable of stably fixing and supporting a glass substrate, an inspection target, and reflecting illumination light to a lower part of a glass substrate arranged on the opposite side of an imaging part to increase inspection precision from a clear imaged image of a through hole, and a through hole inspection system including the same.

The aspect of the disclosure is not limited to that mentioned above, and other aspects not mentioned will be clearly understood by those skilled in the art from the description below.

A light reflection support according to an embodiment of the disclosure is used in a device for imaging a through hole formed in a substrate and inspecting whether the through hole is normal from the imaged image, and includes: a transparent support part that supports the substrate and has a suction hole that extends to a solid area of the substrate where the through hole is not formed; and a reflection layer part that is arranged on the transparent support part and reflects light incident from the opposite side of the substrate.

According to an embodiment of the disclosure, the reflection layer part may be arranged on the lower surface of the transparent support part to be spaced apart from the substrate.

According to an embodiment of the disclosure, the thickness of the transparent support part may be 2 mm or less.

A through hole inspection system according to an embodiment of the disclosure, which images a through hole formed in a substrate and inspects whether the through hole is normal from the imaged image, includes: a light source part for irradiating light to the substrate; an imaging part for imaging the substrate; a light reflection support having a transparent support part supporting the substrate and having a suction hole extending to a solid area of the substrate where the through hole is not formed, and a reflection layer part arranged on the transparent support part and reflecting light irradiated from the light source part; and a control part for calculating the size of the through hole from the imaged image acquired from the imaging part.

According to an embodiment of the disclosure, the through hole inspection system may further include a porous stage that supports the light reflection support and allows negative pressure provided from a negative pressure generation part to be transmitted to the suction hole.

According to an embodiment of the disclosure, the through hole inspection system may further include a focus transfer part that moves the focus of the imaging part in the thickness direction of the substrate.

According to an embodiment of the disclosure, the through hole may have an upper part diameter formed on the upper surface of the substrate, a lower part diameter formed on the lower surface of the substrate, and a waist diameter formed in the center in the thickness direction of the substrate with a size smaller than the upper part diameter and the lower part diameter.

According to an embodiment of the disclosure, the control part may calculate the size of the upper part diameter from a first imaged image imaged while maintaining the focus of the imaging part at the same height as the upper part diameter, calculate the size of the waist diameter from a second imaged image imaged while maintaining the focus of the imaging part at the same height as the waist diameter, and calculate the size of the lower part diameter from a third imaged image imaged while maintaining the focus of the imaging part at the same height as the lower part diameter.

According to an embodiment of the disclosure, the thickness of the transparent support part may be 2 mm or less.

Through the light reflection support according to the disclosure, a glass substrate being loaded and unloaded can be stably fixed and supported, and a clear imaged image of a through hole can be acquired by reflecting illumination light to the lower part of the glass substrate arranged on the opposite side of an imaging part, thereby increasing the inspection precision of the through hole of the glass substrate.

Through the through hole inspection system including the light reflection support according to the disclosure, inspection of the through hole can be performed quickly and accurately without a large structural change in an inline glass substrate inspection process.

The effects of the disclosure are not limited to the effects described above, and should be understood to include all effects that are inferable from the configuration of the disclosure described in the detailed description or claims of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
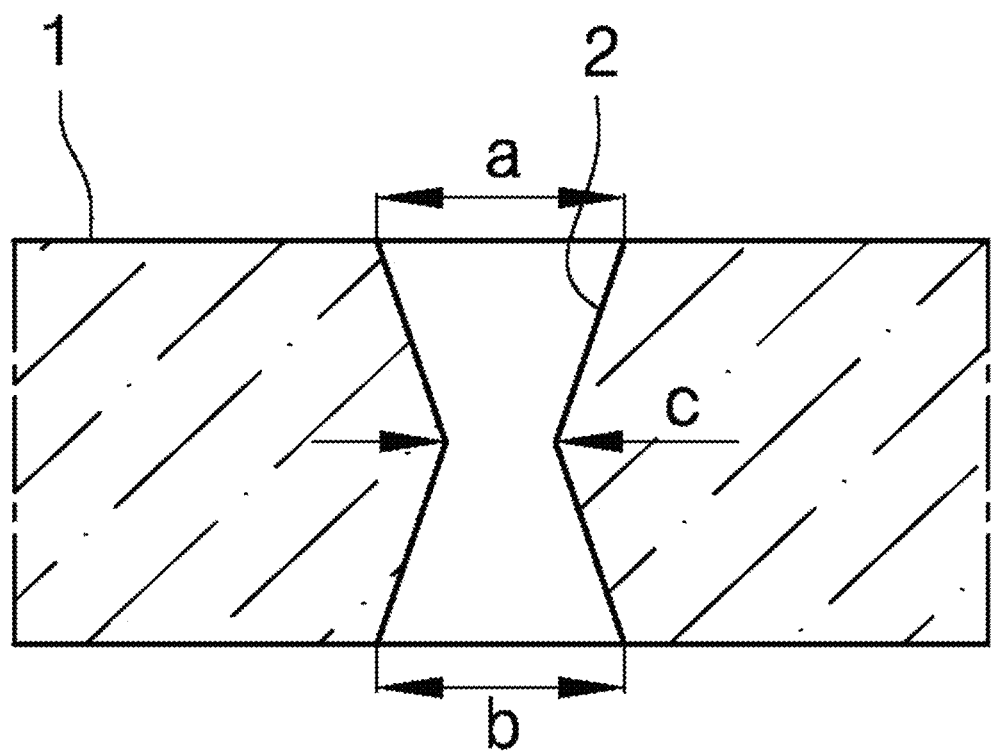
FIG. 1 is a partial cross-sectional example view of a glass substrate having a through hole.

Hereinafter, the disclosure will be described with reference to the accompanying drawings. However, the disclosure may be implemented in various different forms and, therefore, is not limited to the embodiments described herein. In order to clearly explain the disclosure in the drawings, portions unrelated to the description are omitted, and similar portions are given similar reference numerals throughout the specification.

Throughout the specification, when a portion is said to be "connected (linked, contacted, combined)" with another portion, this includes not only a case of being "directly connected" but also a case of being "indirectly connected" with another member in between. In addition, when a portion is said to "include" a certain component, this does not mean that other components are excluded, but that other components may be added, unless specifically stated to the contrary.

The terms used herein are merely used to describe specific embodiments and are not intended to limit the disclosure. Singular expressions include plural expressions unless the context clearly dictates otherwise. In this specification, it should be understood terms such as "include" or "have" are to designate the presence of features, numbers, steps, operations, components, parts, or combinations thereof described in the specification, but are not to exclude in advance the possibility of the presence or addition of one or more other features, numbers, steps, operations, components, parts, or combinations thereof.

Hereinafter, embodiments of the disclosure will be described in detail with reference to the accompanying drawings.

Figure 2:
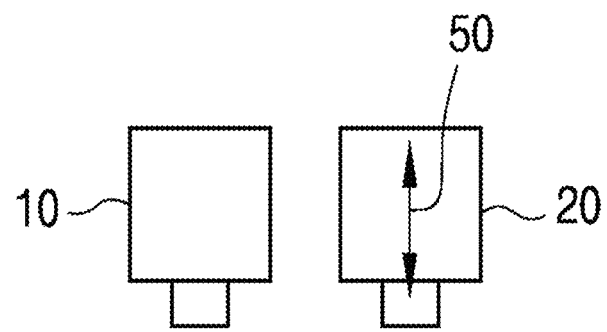
FIG. 2 is an example view of a through hole inspection system according to an embodiment of the disclosure.
Figure 2:
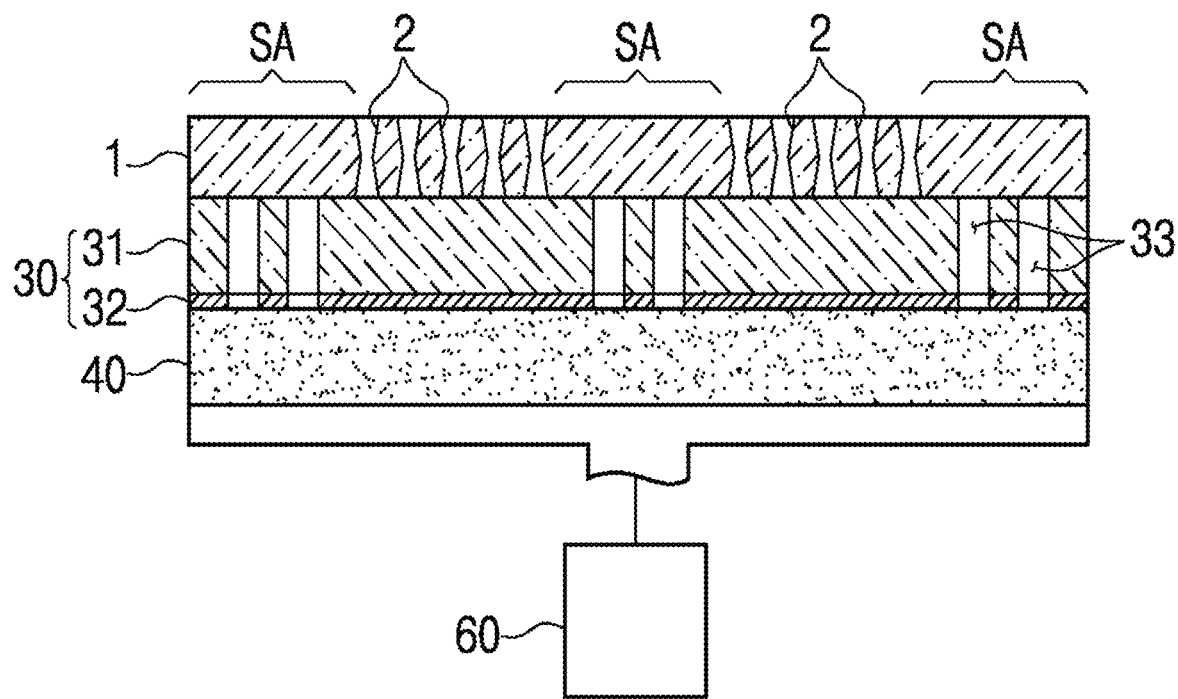
Figure 3:
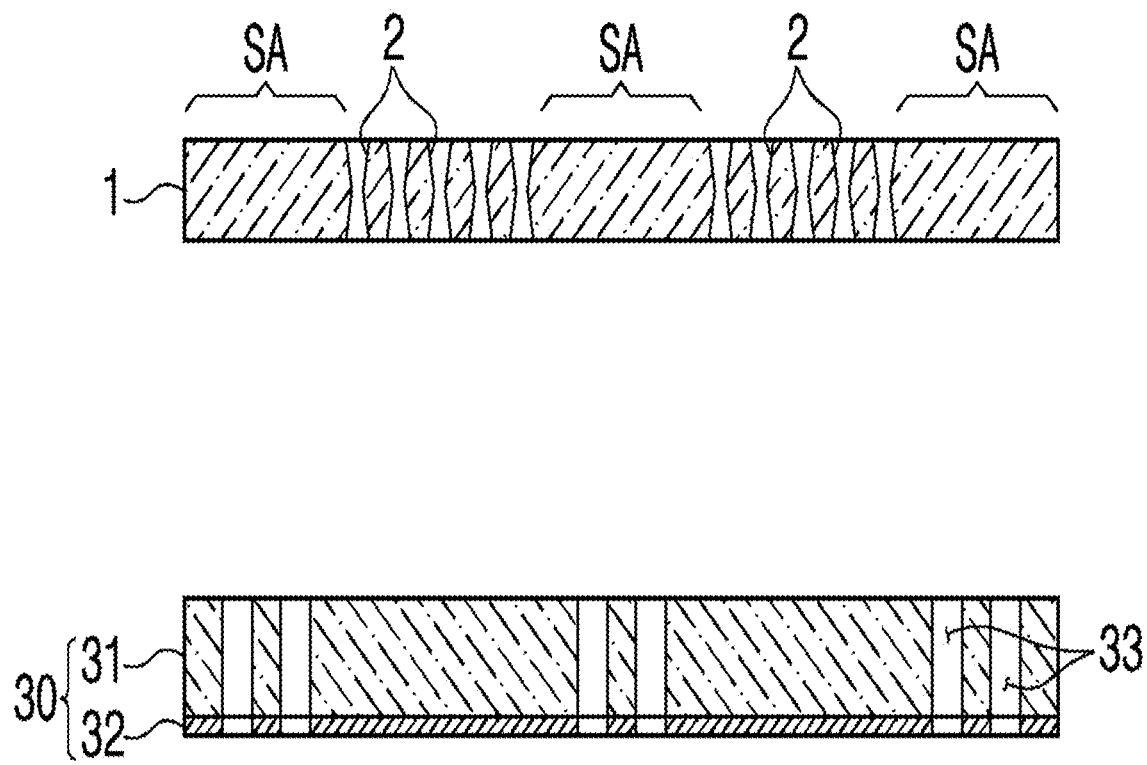
FIG. 3 is an example cross-sectional view showing a substrate and a light reflection support of FIG. 2.
Figure 4:
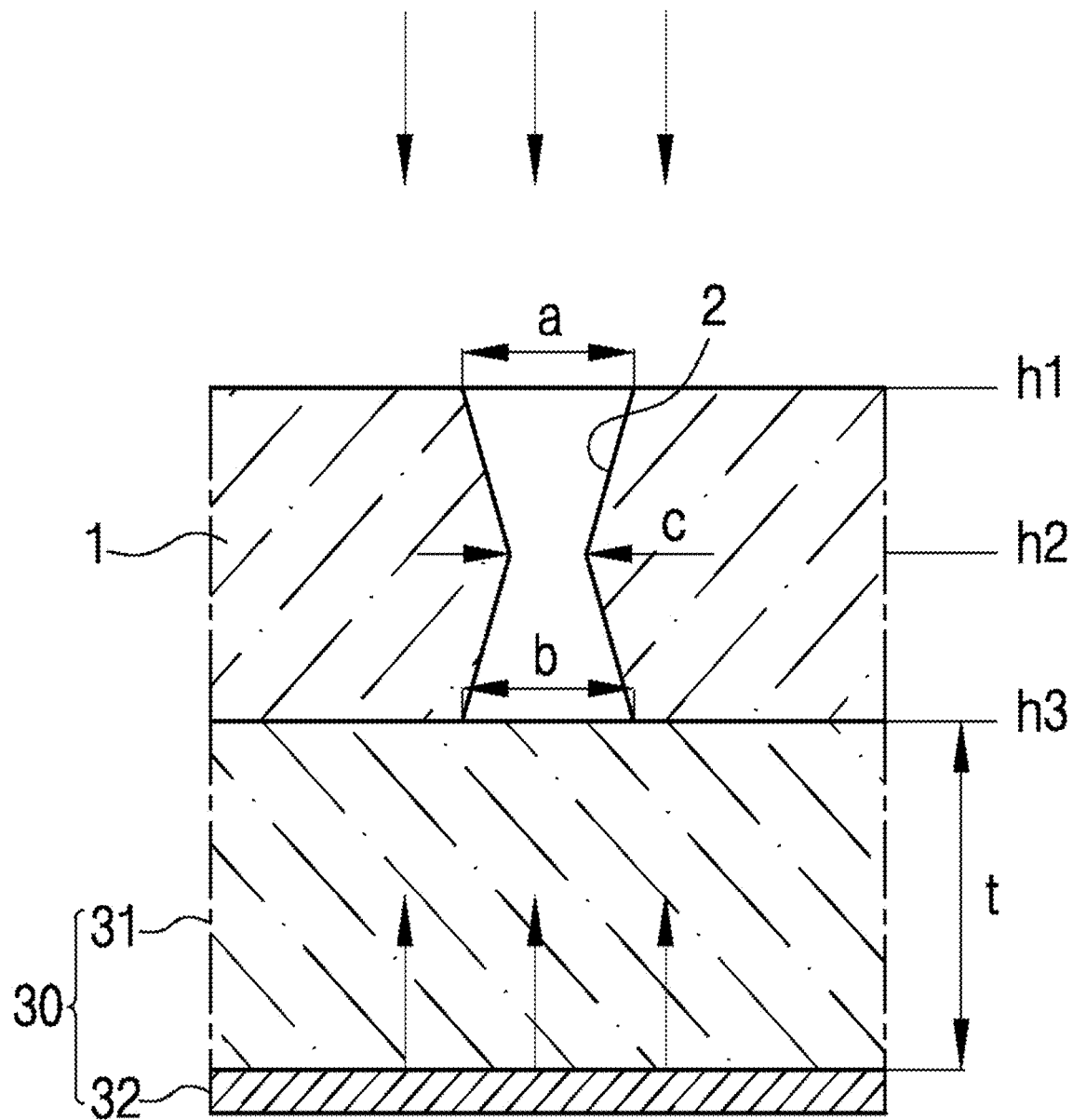
FIG. 4 is an example cross-sectional view for explaining a light reflection support of FIG. 2.

FIG. 2 is an example view of a through hole inspection system according to an embodiment of the disclosure, FIG. 3 is an example cross-sectional view showing a substrate and a light reflection support of FIG. 2, and FIG. 4 is an example cross-sectional view for explaining a light reflection support of FIG. 2.

Referring to FIGS. 2 to 4, a through hole inspection system according to an embodiment of the disclosure may basically image a substrate 1, and calculates hole processing information, such as the position, shape, and size, of a through hole 2 formed in the substrate 1 based on the imaged image, and may inspect whether the through hole 2 is normal or not.

Likewise, the through hole inspection system measures and calculates processing information of the through hole 2, such as the position, shape, and size of the through hole 2, that requires inspection, and determines whether the corresponding through hole 2 is acceptable or not. In the following description, the diameter, which is representative processing information of the through hole 2, is used as the basis.

The substrate 1 to be inspected may be made as a transparent substrate made of glass or the like, and may have a plurality of through holes 2.

Each through hole 2 may have a shape in which the inner center is concave compared to the diameter of the surface. That is, the through hole 2 may have an upper part diameter a formed on the upper surface of the substrate 1, a lower part diameter b formed on the lower surface of the substrate 1, and a waist diameter c formed in the center in the thickness direction of the substrate 1 with a size smaller than the upper part diameter a and the lower part diameter b.

That is, according to the through hole inspection system of the disclosure, the upper part diameter a, the lower part diameter b, and the waist diameter c of the through hole 2 formed in the substrate 1 may be accurately measured and calculated.

The through hole inspection system according to the present embodiment may include a light source part 10, an imaging part 20, a light reflection support 30, and a control part.

The light source part 10 may be arranged on an upper side, one side of the substrate 1, and may irradiate light toward the substrate 1.

The imaging part 20 may be arranged on the upper side, one side of the substrate 1, and may image the substrate 1 to which light has been irradiated.

The light reflection support 30 may be arranged on a lower side of the substrate 1 opposite the light source part 10 and the imaging part 20 with respect to the substrate 1.

The light reflection support 30 may provide illumination light to the lower part of the substrate 1 opposite to the light source part 10 by reflecting the light irradiated from the light source part 10 while fixing and supporting the substrate 1.

The light reflection support 30 may have a transparent support part 31 and a reflection layer part 32.

The transparent support part 31 may be made of a transparent material such as glass.

The transparent support part 31 may be arranged on the lower side of the substrate 1 and may be closely attached to the lower surface of the substrate 1 to be loaded.

The transparent support part 31 may have a plurality of suction holes 33. When the substrate 1 is loaded on the upper surface of the transparent support part 31 and then a negative pressure is formed in the suction hole 33, the substrate 1 may be closely attached to the upper surface of the transparent support part 31 and fixedly supported thereon.

The suction hole 33 may be formed by extending to a solid area SA where the through hole 2 of the substrate 1 is not formed so that the negative pressure is not lost. As shown, the through hole 2 may be formed by extending to an edge solid area SA or a center solid area SA of the substrate 1 where the through hole 2 is not formed. Accordingly, the substrate 1 may maintain a flat loading state on the upper surface of the transparent support part 31.

It is preferable that the transparent support part 31 has a thickness t of 2 mm or less.

Some of light irradiated from the light source part 10 and passing through the substrate 1 undergoes reflection, refraction, diffraction, and scattering phenomena in a process of passing through the transparent support part 31, and in order to minimize a phase difference according to these optical characteristics, it is advantageous for the transparent support part 31 to have a thin thickness t of 2 mm or less.

If the thickness t of the transparent support part 31 exceeds 2 mm, the reflection, refraction, diffraction, and scattering phenomena of light increase in a process of passing through the substrate 1 and the transparent support part 31. In addition, since the reflection, refraction, and scattering phenomena of light reflected from the reflection layer part 32 and transmitted to the substrate 1 are accumulated and further increased, the clarity of the imaged image of the lower part diameter b and waist diameter c through the imaging part 20 is reduced.

Therefore, it is preferable for the transparent support part 31 to have a thickness t of 2 mm or less so that a phase difference according to the optical characteristics is minimized.

The reflection layer part 32 may be arranged on the upper or lower surface of the transparent support part 31.

The reflection layer part 32 may reflect light irradiated from the light source part 10 and provide illumination light to the lower part of the substrate 1.

The reflection layer part 32 may be made of a metal material with a high reflectivity such as Al, and may be formed into a thin film structure by being coated on the surface of the transparent support part 31 by chemical deposition or the like. By providing the reflection layer part 32 with a thin film structure coated on the surface of the transparent support part 31, the suction hole 33 may be guaranteed to have a penetration structure without blockage.

The reflection layer part 32 may be arranged on the upper surface of the transparent support part 31, but then, there is a possibility that defects such as scratches due to friction may occur during the repeated loading, unloading, and transferring of the substrate 1, and as a result, the quality of the imaged image imaged by the imaging part 20 may deteriorate.

Therefore, it is preferable that the reflection layer part 32 is arranged on the lower surface of the transparent support part 31 to be separated from the substrate 1. Then, the occurrence of defects in the reflection layer part 32 due to friction during repeated loading, unloading, and transferring of the substrate 1 may be suppressed, durability may be improved, and the quality of the imaged image imaged by the imaging part 20 may be prevented as well.

The through hole inspection system according to an embodiment of the disclosure may further include a stage 40.

The stage 40 may basically fix and support the light reflection support 30 on which the substrate 1 is loaded, and may transfer the light reflection support 30.

The stage 40 may be provided to have a porous material or a porous structure. Then, negative pressure provided from an external negative pressure generation part 60 may be transferred to the suction hole 33 side of the light reflection support 30.

The through hole inspection system according to an embodiment of the disclosure may further include a focus transfer part 50.

The focus transfer part 50 may move the focus of the imaging part 20 in the thickness direction of the substrate 1. An optical system provided in the imaging part 20 may be used as the focus transfer part 50.

The control part may calculate the size of the upper part diameter a, lower part diameter b, and waist diameter c of the through hole 2 from the imaged image acquired from the imaging part 20.

Figure 5:
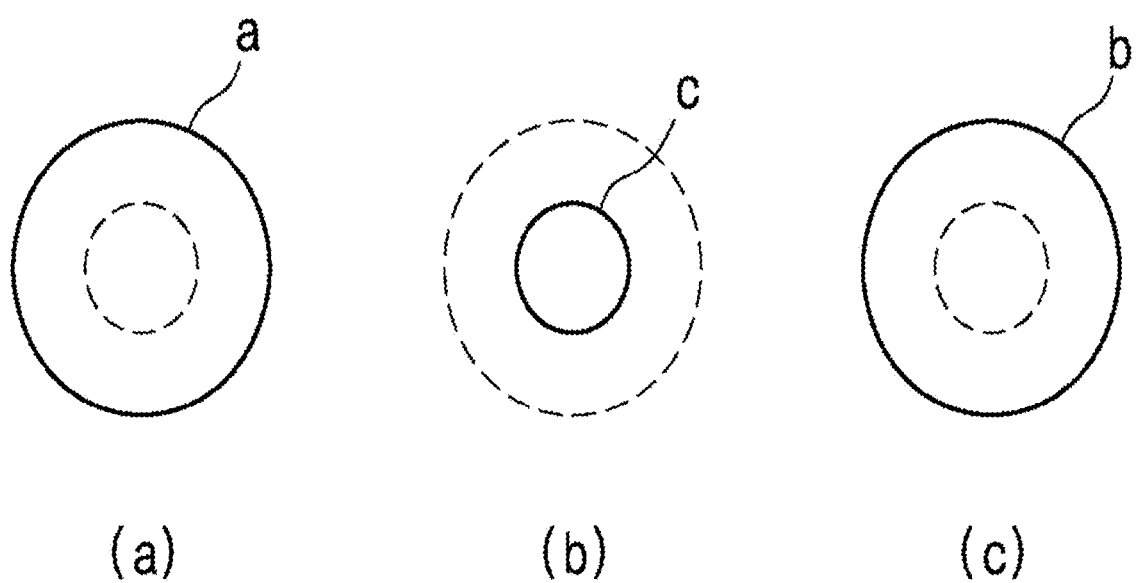
FIG. 5 is an example view showing an imaged image imaged by an imaging part according to an embodiment of the disclosure.

FIG. 5 is an example view showing an imaged image imaged by an imaging part according to an embodiment of the disclosure.

Referring to FIGS. 4 and 5, a process of calculating the size of the upper part diameter a, lower part diameter b, and waist diameter c of the through hole 2 through the control part is explained as follows.

First, the control part is set so that the focus of the imaging part 20 is maintained at the same height h1 as the upper part diameter a of the through hole 2. In this state, the imaging part 20 images the substrate 1 to acquire a first imaged image. The first imaged image acquired in this manner may have a form like (a) of FIG. 5. Then, the control part may calculate the size of the upper part diameter a from the first imaged image using a general image processing/filtering program based on clarity or contrast.

Next, the control part is set so that the focus of the imaging part 20 is maintained at the same height h2 as the waist diameter c of the through hole 2. In this state, the imaging part 20 images the substrate 1 to acquire a second imaged image. The second imaged image acquired in this manner may have a form like (b) of FIG. 5. In addition, the control part may calculate the size of the waist diameter c from the second imaged image using the conventional image processing/filtering program described above.

Next, the control part is set so that the focus of the imaging part 20 to be maintained at the same height h3 as the diameter b of the lower part of the through hole 2. In this state, the imaging part 20 images the substrate 1 to acquire a third imaged image. The third imaged image acquired in this manner may have a form like (c) of FIG. 5. Here, since the light irradiated from the light source part 10 is reflected from the reflection layer part 32 of the light reflection support 30 to the lower surface of the substrate 1, the third imaged image may also have clarity similar to that of the first imaged image. The control part may calculate the size of the lower part diameter b from the third imaged image using the conventional image processing/filtering program described above.

Likewise, while adjusting the focal length of the imaging part 20 in the thickness direction of the substrate 1 through a focus transfer part 50, multiple imaged images are acquired in the depth direction of the through hole 2, and the sizes of the upper part diameter a, waist diameter c, and lower part diameter b of the through hole 2 may be accurately calculated from the multiple imaged images acquired.

Of course, according to the disclosure, the upper part diameter a, waist diameter c, and lower part diameter b of the through hole 2 may be calculated at once from one imaged image imaged by the imaging part 20. For example, the control part is set so that the focus of the imaging part 20 is maintained at the same height h2 as the waist diameter c, which is the center of the through hole 2, and the upper part diameter a, waist diameter c, and lower part diameter b may be calculated at once from one imaged image imaged in this state. However, in this case, the clarity of the imaged images for the upper part diameter a and lower part diameter b may be relatively reduced. Therefore, considering the specifications of the image processing/filtering program used or the thickness of the substrate 1 or the like, the number of imaged images of the through hole 2 may be appropriately adjusted and set.

As described above, the light reflection support 30 according to the disclosure may stably fix and support the glass substrate 1 being loaded and unloaded, and may acquire a clear imaged image of the through hole 2 by reflecting illumination light to the lower part of the glass substrate 1 arranged on the opposite side of the imaging part 20. Through this, the inspection precision for the through hole 2 of the glass substrate 1 having a waist diameter with a concave center may be greatly increased.

In addition, the through hole inspection system including the light reflection support 30 according to the disclosure may quickly and accurately perform inspection for the through hole 2 without a major structural change in an inline glass substrate inspection process.

The description of the disclosure described above is for illustrative purposes, and those skilled in the art will understand that the disclosure is easily modifiable into other specific forms without changing the technical idea or essential features of the disclosure. Therefore, the embodiments described above should be understood in all respects as illustrative and not restrictive. For example, each component described as single may be implemented in a distributed manner, and similarly, components described as distributed may also be implemented in a combined form.

The scope of the disclosure is indicated by the claims described below, and all changes or modified forms derived from the meaning and scope of the claims and their equivalent concepts should be construed as being included in the scope of the disclosure.

EXPLANATION OF REFERENCE NUMERALS

1: substrate
2: through hole
a: upper part diameter
b: lower part diameter
c: waist diameter
10: light source part
20: imaging part
30: light reflection support
40: stage
50: focus transfer part

What is claimed is:

1. A light reflection support used in a device for imaging an image of a through hole formed in a substrate and inspecting whether the through hole is normal from the image, the light reflection support comprising:
   a transparent support part configured to support a lower surface of the substrate and has a suction hole that extends from a lower surface of the transparent support part to an upper surface of the transparent support part, the suction hole being configured to extend to a solid area of the substrate where no through hole of the substrate is defined; and
   a reflection layer part arranged on the lower surface of the transparent support part to be spaced apart from the substrate, the reflection layer part being configured to reflect light incident from a side of the substrate that is opposite to the lower surface of the substrate,
   wherein the reflection layer part is a film coated on the lower surface of the transparent support part, such that the suction hole has a penetration structure without blockage.

2. The light reflection support of claim 1,
   wherein a thickness of the transparent support part is 2 mm or less.

3. A through hole inspection system for imaging an image of a through hole formed in a substrate and inspecting whether the through hole is normal from the image, the through hole inspection system comprising:
   a light source configured to irradiate light to the substrate;
   an imaging configured to image the substrate;
   a light reflection support having:
   a transparent support part configured to support a lower surface of the substrate, the transparent support part having a suction hole extending from a lower surface of the transparent support part to an upper surface of the transparent support part, the transparent support part being configured to extend to a solid area of the substrate where the no through hole of the substrate is defined; and
   a reflection layer part arranged on the lower surface of the transparent support part to be spaced apart from the substrate, the reflection layer part being configured to reflect the light irradiated from the light source; and
   a controller configured to calculate a size of the through hole from an image acquired from the imaging part,
   wherein the reflection layer part is a film coated on the lower surface of the transparent support part, such that the suction hole has a penetration structure without blockage.

4. The through hole inspection system of claim 3, further comprising:
a porous stage configured to support the light reflection support and allow negative pressure provided from a negative pressure generation part to be transmitted to the suction hole.

5. The through hole inspection system of claim 3, further comprising:
a focus transfer part configured to move a focus of the imaging part in a thickness direction of the substrate.

6. The through hole inspection system of claim 5, wherein the through hole has an upper part diameter defined on an upper surface of the substrate, a lower part diameter defined on a lower surface of the substrate, and a waist diameter defined in a center in the thickness direction of the substrate, the waist diameter having a size smaller than a size of the upper part diameter and the lower part diameter.

7. The through hole inspection system of claim 6, wherein the controller is configured to calculate the size of the upper part diameter from a first image imaged while maintaining the focus of the imaging part at a same height as the upper part diameter, calculate the size of the waist diameter from a second image imaged while maintaining the focus of the imaging part at a same height as the waist diameter, and calculate the size of the lower part diameter from a third image imaged while maintaining the focus of the imaging part at a same height as the lower part diameter.

8. The through hole inspection system of claim 3, wherein a thickness of the transparent support part is 2 mm or less.

* * * * *